United States Patent
Kimoto et al.

(10) Patent No.: US 9,923,187 B2
(45) Date of Patent: Mar. 20, 2018

(54) SENSOR FUSE FOR AN ELECTRIC BATTERY ARRAY

(71) Applicant: Ford Global Technologies, LLC, Dearborn, MI (US)

(72) Inventors: Masahiro Kimoto, Plymouth, MI (US); Debbi Callicoat, Livonia, MI (US); Rajesh Narayanan, Canton, MI (US); Francisco Fernandez-Galindo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/224,704

(22) Filed: Aug. 1, 2016

(65) Prior Publication Data

US 2018/0034034 A1    Feb. 1, 2018

(51) Int. Cl.
  *H01M 2/20* (2006.01)
  *H01M 2/30* (2006.01)
  *H01M 2/34* (2006.01)
  *B60L 11/18* (2006.01)
  *H01M 10/48* (2006.01)

(52) U.S. Cl.
  CPC .......... *H01M 2/34* (2013.01); *B60L 11/1879* (2013.01); *H01M 2/206* (2013.01); *H01M 10/48* (2013.01); *H01M 2220/20* (2013.01)

(58) Field of Classification Search
  CPC ........ H01M 2/34; H01M 2/206; H01M 10/48; H01M 2220/20; B60L 11/1879
  See application file for complete search history.

(56) References Cited

U.S. PATENT DOCUMENTS

| | | |
|---|---|---|
| 5,300,755 A | 4/1994 | Nishitani et al. |
| 9,024,572 B2 | 5/2015 | Nishihara et al. |
| 2015/0079456 A1 | 3/2015 | Paulseser |
| 2015/0165926 A1 | 6/2015 | Kim et al. |
| 2015/0214534 A1 | 7/2015 | Callicoat et al. |
| 2015/0224892 A1* | 8/2015 | Callicoat ............. H01M 2/1077 429/90 |
| 2016/0218401 A1* | 7/2016 | Hermann ............ H01M 10/486 |
| 2016/0315359 A1* | 10/2016 | Tyler ................. H01M 2/202 |

* cited by examiner

*Primary Examiner* — Stewart A Fraser
(74) *Attorney, Agent, or Firm* — Brooks Kushman P.C.

(57) ABSTRACT

A vehicle power system may include a battery array having at least one battery with a bus bar connected to an electrical bus. The power system may also include a conductive lead of a sensor welded to the bus bar to form a joint defined by a plurality of stitches, a net cross-sectional area of the plurality being less than a cross-sectional area of the lead such that short-circuit current from the battery array melts the joint to protect the sensor.

18 Claims, 3 Drawing Sheets

SENSOR FUSE FOR AN ELECTRIC BATTERY ARRAY

TECHNICAL FIELD

This disclosure relates to sensor fuses for electric battery arrays.

BACKGROUND

Electric and hybrid vehicles may include battery arrays or banks to store and release electric energy. The battery voltage may be monitored by attaching sensors. The sensors may be intertwined between bus bars having opposite polarity.

SUMMARY

A vehicle power system may include a battery array having at least one battery with a bus bar connected to an electrical bus. The power system may also include a conductive lead of a sensor welded to the bus bar to form a joint defined by a plurality of stitches, a net cross-sectional area of the plurality being less than a cross-sectional area of the lead such that short-circuit current from the battery array melts the joint to protect the sensor. The stitches may be arranged along an axis of the conductive lead. The stitches may be arranged perpendicular to an axis of the conductive lead. The lead may be a 22-gauge wire. The stitches may have a surface area equivalent to a 26-gauge wire. The net cross-sectional area of the plurality may be between 60-70% of the cross-sectional area of the lead.

A method may include joining a conductive lead of a sensor to a bus bar of a battery array with a laser weld to form a joint defined by a plurality of laser weld stitches, a net cross-sectional area of the plurality being less than a cross-sectional area of the lead such that short-circuit current from the battery array melts the joint to protect the sensor. The stitches may be arranged along an axis of the conductive lead. The stitches may be arranged perpendicular to an axis of the conductive lead. The lead may be a 22-gauge wire. The stitches may have a surface area equivalent to a 26-gauge wire. The net cross-sectional area of the plurality may be between 60-70% of the cross-sectional area of the lead.

A vehicle power system may include a battery array including at least one battery having a bus bar connected to an electrical bus. The system may further include a conductive lead of a sensor laser welded to the bus bar to form a joint defined by a plurality of stitches, a net cross-sectional area of the plurality being less than a cross-sectional area of the lead, and oriented with a free-falling attitude such that short-circuit current from the battery array melts the joint to protect the sensor and separates the lead and bus bar. The stitches may be arranged along an axis of the conductive lead. The stitches may be arranged perpendicular to an axis of the conductive lead. The lead may be a 22-gauge wire. The stitches may have a surface area equivalent to a 26-gauge wire. The net cross-sectional area of the plurality may be between 60-70% of the cross-sectional area of the lead.

DETAILED DESCRIPTION

Figure 1:
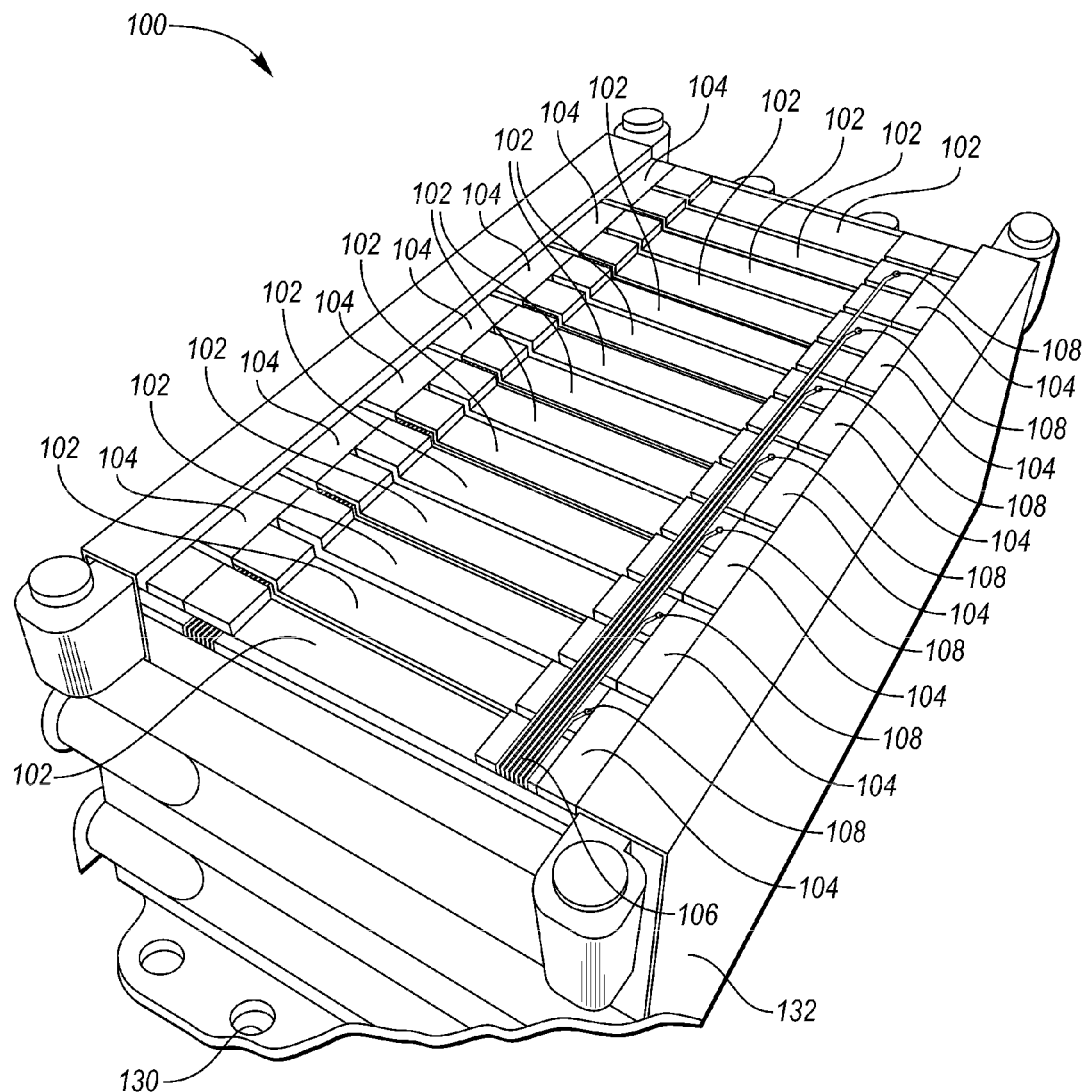
FIG. 1 depicts a battery array configured in a series configuration.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Power modules or battery arrays may include a large number of battery cells. Each of the cells may be electrically joined in series to increase the electric potential between terminals of the array. Each of the cells may be electrically connected using a bus bar between individual positive and negative terminals to compound the voltage. The voltage of each bus bar may be monitored absolutely or relatively with a controller or sensor. The controller may be electrically connected to each of the bus bars using a flat flexible cable (FFC). The FFC may be terminated at each individual bus bar on a given side of the battery array to provide voltage feedback to a controller. The FFC may include several individual conductors. The FFC may provide a pathway for short-circuit current to leak between bus bars.

Hard terminations provide an unrelenting electrical connection between sensor leads capable of carrying current equivalent to the cross-sectional area of the wire. The sensor leads may provide a path for short circuits. Installation of fuses may protect against short circuits. Installation of standard fuses may increase manufacturing costs and introduce a single point of failure. To overcome these problems the sensor lead and bus bar may be welded together in a fashion that creates a fuse.

A fuse may be created using a tungsten inert gas (TIG) welding, metal inert gas (MIG) welding, or arc welding. The weld may be used to create a desirable connection between the conductive lead and the bus bar. These methods may create undesirable welds. Laser beam welding may fuse the sensor lead to the bus bar. The laser beam weld may create a joint that has a net cross-sectional area that is smaller than the sensor lead. The smaller cross-sectional area ensures that separation of the sensor lead and bus bar will occur under high current as the stitches of the joint melt.

The sensor lead may be joined to the bus bar in any orientation or configuration. The joint may be located on any side of the bus bar. For example, the sensor lead may be welded to a bottom portion of the bus bar such that gravity ensures separation of sensor lead and the bus bar after melting of the fuse. The sensor lead may be welded to a side portion of the bus bar such that tension and gravity draw the sensor lead away from the bus bar after overcurrent protection is provided. Additionally, the sensor lead may be located on the top portion of the bus bar.

The stitches used to join the sensor lead and bus bar may have various spatial arrangements. The stitches may be arranged along an axis of the sensor lead. The stitches may be arranged transverse the axis of the sensor lead. The stitches may be arranged in any geometric shape that provides adequate strength and yields the proper net cross-sectional area. The stitches may be arranged to have a net cross-sectional area less than the cross-sectional area of the sensor lead. For example, the sensor lead may be a 22-gauge wire having a cross-sectional area of 0.326 mm$^2$. One large stitch or a plurality of stitches may be used to create a fused joint having a cross-sectional area of 0.14 mm$^2$, which is similar to the cross-sectional area of a 26-gauge wire.

Now referring to FIG. 1, a battery array or assembly 100 is depicted. A plurality of battery modules 102 are arranged to form the battery array 100. The battery modules 102 may be located in a battery array chassis 132. The chassis 132 may be affixed to a support member using through holes 130. The battery modules 102 are electrically connected in series using bus bars 104. The battery modules 102 may be connected in parallel. A gap may exist between each of the battery modules 102 to form the array 100. An FFC 106 may span across some or a portion of the battery modules 102. The FFC 106 may have been associated with a plurality of conductors or conductive leads 108. Each conductive lead 108 of the FFC 106 may be terminated on some or all of the bus bars 104. As shown, the conductive leads 108 may be terminated on the top of the bus bars 104. The conductive leads 108 may also be terminated on the bottom or sides of the bus bars 104. Although shown having uniform terminations, the conductive leads 108 may be terminated in different orientations with respect to one another. The conductive leads 108 may be oriented with a free-falling attitude such that separation between the bus bar 104 and conductive lead 108 occurs during a short circuit. The separation may be due to mechanical biasing of the conductive lead 108 or FFC 106 or gravitational forces.

Figure 2:
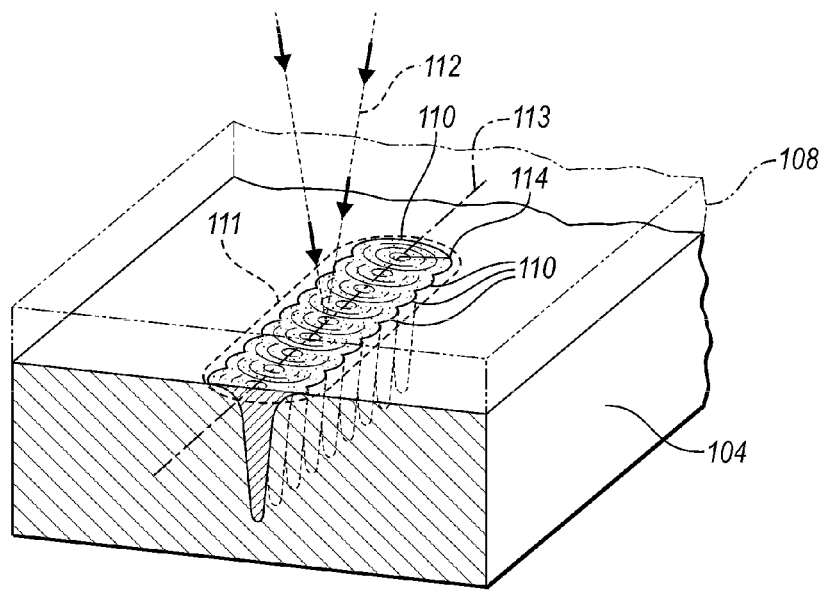
FIG. 2 depicts a series of stitches from a laser weld between a wire and a bus bar.

Now referring to FIG. 2, a laser weld 111 by a laser beam 112 between a bus bar 104 and a conductive lead 108 is shown. The laser weld 111 may be arranged along an axis 113 of the conductive lead 108. The weld 111 may have a plurality of stitches 110. The stitches 110 may have some overlap. The stitches 110 may have a uniform or non-uniform diameter 114. The weld 111 may have a surface area less than the surface area of the conductive lead 108. The surface area of the weld 111 may be 60-70% of the surface area of the conductive lead 108.

Figures 3A, 3B:
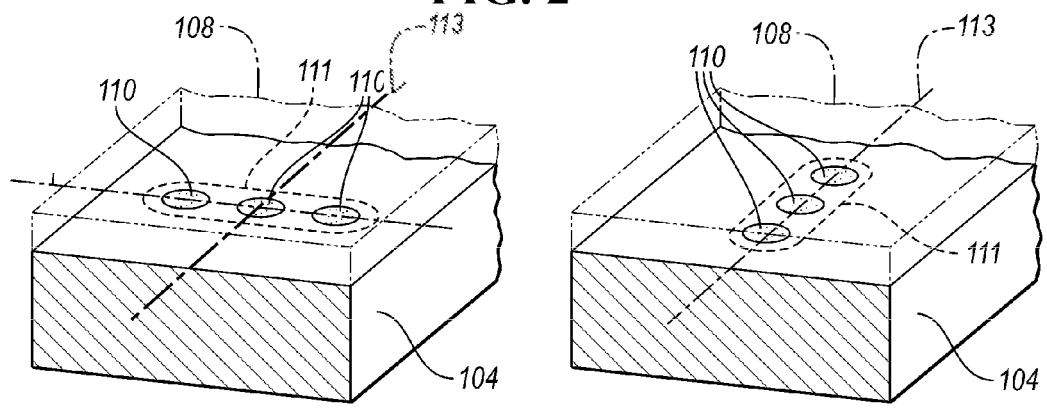
FIG. 3A depicts a series of stitches from a laser weld transverse to an axis of the wire.
FIG. 3B depicts a series of stitches from a laser weld along an axis of the wire.
Figure 3C:
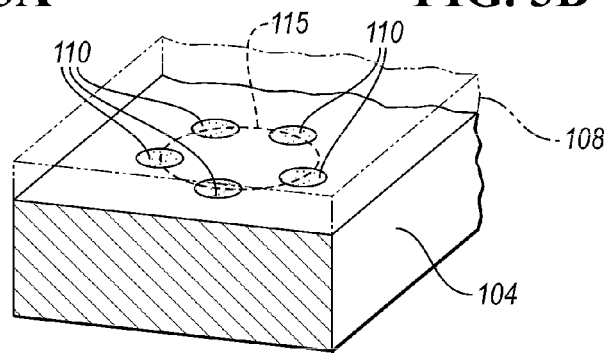
FIG. 3C depicts a group of stitches arranged in a circular or triangular configuration.

Now referring to FIG. 3A-C, a plurality of laser weld orientations and configurations are shown. FIG. 3A discloses a conductive lead 108 laser welded 111 to a bus bar 104. The laser weld 111 has stitches 110 having an orientation transverse to the axis 113 of the conductive lead 108. FIG. 3B discloses a conductive lead 108 laser welded 111 to a bus bar 104. The laser weld 111 has stitches 110 having an orientation along the axis 113 of the conductive lead 108. FIG. 3C discloses a conductive lead 108 laser welded 111 to a bus bar 104. The laser weld 111 has stitches 110 having a circular orientation 115.

Figure 4:
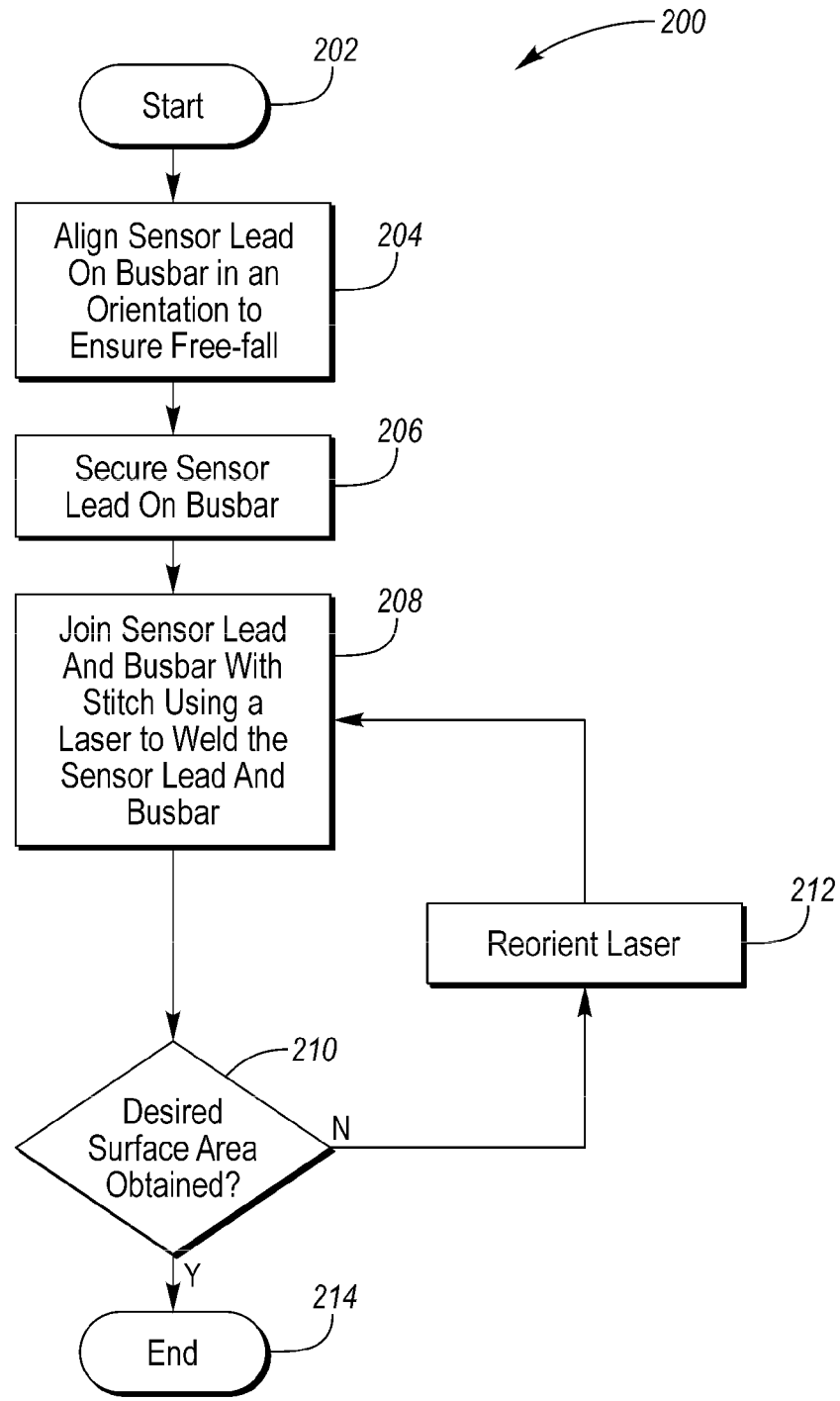
FIG. 4 depicts a method for laser welding a bus bar and a conductive lead.

Now referring to FIG. 4, a flow diagram 200 is disclosed. The flow diagram 200 starts in step 202. In step 204, the sensor lead is aligned with the bus bar in an orientation that ensures free-fall of the sensor lead after the fuse or weld is expended, meaning at least a portion of the sensor lead has a free-falling attitude. The free-falling attitude ensures that conduction will cease during a short because of physical separation of the sensor lead and bus bar. In step 206, the sensor lead is secured to the bus bar using a clamp or adhesive to ensure an effective laser weld. In step 208, the sensor lead is joined with the bus bar using a stitch from a laser weld. In step 210, the join may be checked for quality and to ensure the proper size stitch and weld surface area is used. If the surface area is inadequate the laser may be reoriented in step 212. If the surface area obtained has adequate fastening capabilities and is not too large, the process will end in step 214.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising: a battery array including at least one battery having a bus bar connected to an electrical bus; and a conductive lead of a sensor welded to the bus bar to form a joint defined by a plurality of stitches, a net cross-sectional area of the plurality of stitches being less than a cross-sectional area of the lead such that short-circuit current from the battery array melts the joint to protect the sensor.

2. The vehicle power system of claim 1, wherein the plurality of stitches are arranged along an axis of the conductive lead.

3. The vehicle power system of claim 1, wherein the plurality of stitches are arranged perpendicular to an axis of the conductive lead.

4. The vehicle power system of claim 1, wherein the conductive lead is a 22-gauge wire.

5. The vehicle power system of claim 4, wherein the plurality of stitches have a surface area equivalent to a 26-gauge wire.

6. The vehicle power system of claim 1, wherein the net cross-sectional area of the plurality of stitches is between 60-70% of the cross-sectional area of the conductive lead.

7. A method comprising: joining a conductive lead of a sensor to a bus bar of a battery array with a laser weld to form a joint defined by a plurality of laser weld stitches, a net cross-sectional area of the plurality of laser weld stitches being less than a cross-sectional area of the lead such that short-circuit current from the battery array melts the joint to protect the sensor.

8. The method of claim 7, wherein the plurality of laser weld stitches are arranged along an axis of the conductive lead.

9. The method of claim 7, wherein the plurality of laser weld stitches are arranged perpendicular to an axis of the conductive lead.

10. The method of claim 7, wherein the conductive lead is a 22-gauge wire.

11. The method of claim 10, wherein the plurality of laser weld stitches have a surface area equivalent to a 26-gauge wire.

12. The method of claim 7, wherein the net cross-sectional area of the plurality of laser weld stitches is between 60-70% of the cross-sectional area of the conductive lead.

13. A vehicle power system comprising: a battery array including at least one battery having a bus bar connected to an electrical bus; and a conductive lead of a sensor laser welded to the bus bar to form a joint defined by a plurality of stitches, a net cross-sectional area of the plurality of stitches being less than a cross-sectional area of the conductive lead, and oriented with a free-falling attitude such that short-circuit current from the battery array melts the joint to protect the sensor and separates the conductive lead and bus bar.

14. The vehicle power system of claim 13, wherein the plurality of stitches are arranged along an axis of the conductive lead.

15. The vehicle power system of claim 13, wherein the plurality of stitches are arranged perpendicular to an axis of the conductive lead.

16. The vehicle power system of claim 13, wherein the conductive lead is a 22-gauge wire.

17. The vehicle power system of claim 16, wherein the plurality of stitches have a surface area equivalent to a 26-gauge wire.

18. The vehicle power system of claim 13, wherein the net cross-sectional area of the plurality of stitches is between 60-70% of the cross-sectional area of the conductive lead.

* * * * *